United States Patent
Alm et al.

(10) Patent No.: US 7,979,090 B2
(45) Date of Patent: Jul. 12, 2011

(54) TA UPDATE IN ADAPTIVE ANTENNA SYSTEMS

(75) Inventors: Martin Alm, Mölndal (SE); Magnus L. Berg, Stockholm (SE); Johnny Ahl, Linghem (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1170 days.

(21) Appl. No.: 11/597,835

(22) PCT Filed: May 28, 2004

(86) PCT No.: PCT/SE2004/000840
§ 371 (c)(1),
(2), (4) Date: Nov. 28, 2006

(87) PCT Pub. No.: WO2005/117290
PCT Pub. Date: Dec. 8, 2005

(65) Prior Publication Data
US 2008/0085715 A1    Apr. 10, 2008

(51) Int. Cl.
*H04M 1/00* (2006.01)
(52) U.S. Cl. .................. 455/562.1; 455/450; 455/452.1
(58) Field of Classification Search .................. None
See application file for complete search history.

(56) References Cited

U.S. PATENT DOCUMENTS

| | | | |
|---|---|---|---|
| 6,301,238 B1* | 10/2001 | Hagerman et al. | 370/336 |
| 6,477,151 B1 | 11/2002 | Oksala | |
| 6,553,012 B1* | 4/2003 | Katz | 370/328 |
| 6,693,892 B1* | 2/2004 | Rinne et al. | 370/348 |
| 6,697,640 B1 | 2/2004 | Katz et al. | |
| 2002/0123370 A1* | 9/2002 | Berg et al. | 455/562 |
| 2007/0265012 A1* | 11/2007 | Sorbara et al. | 455/446 |

FOREIGN PATENT DOCUMENTS

| | | |
|---|---|---|
| CN | 1385008 A | 12/2002 |
| EP | 1 096 696 A1 | 5/2001 |
| WO | 01/31810 | 5/2001 |
| WO | WO 01/89030 A1 * | 11/2001 |

OTHER PUBLICATIONS

Martin Alm and Stephen Craig, Adaptive Antenna Systems and EGPRS Data Protocol Aspects, 2004 IEEE 59th Vehicular Technology Conference, May 17-19, 2004, Proceedings vol. 1, pp. 54-58.*
EP Office Action mailed Sep. 27, 2007 in corresponding EP application 04735440.2-2411.
General Packet Radio Service (GPRS) $3^{rd}$ Generation Partnership Project, 3GPP TS 43.064 V6.1.0 (Aug. 2003), Release 6, pp. 36-39.
CN Office Action and English translation thereof mailed Jun. 19, 2009 in corresponding Chinese application 200480043172.1.
General Packet Radio Service (GPRS), $3^{rd}$ Generation Partnership Project; Technical Specification Group GSM/EDGE, Radio Access, 3GPP TS 43.064 V6.1.0 (Aug. 2003), Stage 2, Release 6.
English translation of Chinese Office Action dated Sep. 13, 2010 (15 pages).

* cited by examiner

*Primary Examiner* — Rafael Pérez-Gutiérrez
*Assistant Examiner* — German Viana Di Prisco
(74) *Attorney, Agent, or Firm* — Nixon & Vanderhye P.C.

(57) ABSTRACT

A method and a system is disclosed for improving transmission of timing advance messages to a mobile station, in a network employing adaptive antenna systems. In a typical embodiment each TA-message is dedicated to one mobile and sent in the adaptive antenna beam that covers the area where the desired mobile is located.

24 Claims, 3 Drawing Sheets

TA UPDATE IN ADAPTIVE ANTENNA SYSTEMS

This application is the US national phase of international application PCT/SE2004/000840 filed 28 May 2004, which designated the U.S., the entire content of which is hereby incorporated by reference.

TECHNICAL FIELD

The present invention relates to communication systems and more exactly to a method and system for transfer of timing advance updating messages to mobile phones in a network employing adaptive antennas.

BACKGROUND

In a mobile phone system mobiles, which communicate with a base station are often located at different distances from the base station. That means the time it takes for information sent by the mobile station (MS) to arrive at the base station is different. Each mobile station is allocated a timeslot, i.e. it is only allowed to transmit during a specific period of time. This is necessary since if two mobile stations were to transmit at the same time it would not be possible for the base station to decode the transmissions. Therefore it is important that the transmissions from the mobile stations arrive at the base station, aligned with the timeslot structure there, i.e. that they do not overlap due to different time delays.

The issue is solved by letting the mobile stations transmit special information sequences, which are used by the base station to calculate an individual time delay. The individual time delay calculated is used to order the mobile stations to offset their transmissions in time such that their transmissions arrive at the base station aligned to the timeslot structure. The message sent to the mobile stations is called a timing advance message (TA-message).

FIG. 1 shows the standard mapping of the Timing Advance (TA) messages onto a multi-frame structure. An Enhanced General Packet Radio Service multi-frame, EGPRS, or General Packet Radio Service GPRS multiframe, consists of 52 Time Division Multiple Access (TDMA) frames, which are divided into 12 Radio Link Control/Medium Access Control (RLC/MAC) blocks plus 4 single bursts. When either GRPS or EGPRS is referred to, hereafter (E)GPRS is used for short.

In an (E)GPRS network several mobile stations can be multiplexed on the same packet data channel (PDCH). The maximum number of mobile stations that can share a PDCH is 16. Every TA-message is interleaved and divided into 4 bursts, which are spread over 2 multi-frames. Each one of the TA-messages contain timing advance information for all mobile stations, but the timing advance information is only updated for 4 mobile stations in each TA-message. Hence 4 TA-messages must be sent in order to update all mobile stations. Thus a mobile station is only required to listen to every 4:th TA-message, however if the mobile station isn't able to decode the message it tries to retrieve the information from the next. The transmission of all TA-messages takes approximately 2 seconds.

An adaptive antenna system is defined to be a system that is able to change its characteristics to changes in the network. Such a system has several interesting properties. One of the most important features on an adaptive antenna system is that the base station is able to detect the direction to the mobile station and can thus transmit dedicated information in an antenna beam towards a desired mobile station. An antenna beam is defined as any signal transmission covering only a part of a cell, and a cell is defined as the total coverage area of a base station. An international application WO 01/31810 A1 is also related to the basic problem of simultaneously transmitting information to mobile stations located in different beams. However the number of mobile stations concerned and the coding of the information sent is different in that application compared to the present one.

All mobile stations assigned to the same Packet Data Channel (PDCH) will be assigned a unique Timing Advance Index (TAI) during the Packet Uplink or Packet Downlink Assignment. The TAI tells the mobile when to transmit its access burst, which is used by the network to calculate the timing advance. The update of the timing advance is sent to the mobile station in the next TA message sent after the burst is received on the uplink. For instance, a mobile that transmits its burst on T1 (see FIG. 1) will receive the updated value in TA message 2.

The timing advance procedure is thoroughly described in the document having the title "Overall description of the GPRS radio interface" [1].

PROBLEMS WITH EXISTING SOLUTIONS

The timing advance message contains information for several mobile stations. In an adaptive antenna system the cell is covered by several narrow beams whereof one is activated at a time. Hence, a problem is encountered since the mobile stations, which should be updated, could be located in different antenna beams. The standard facilitates other possibilities to transmit the TA information to the MS, i.e. in a RLC/MAC control block with the power control or ack/nack message. However, this solution requires that the TA information first is transferred to the Packet Control Unit (PCU) in the Base Station Controller (BSC) to be packaged in the control block and hence requires more signalling between Base Transceiver Station (BTS) and PCU. The continuous TA update is controlled solely by the BTS, which is an advantage.

SUMMARY OF THE INVENTION

In a first embodiment of the invention an extra antenna with a beam that covers the whole cell is used to transmit the TA-update messages. In a second embodiment of the invention one TA-message is sent in each adaptive antenna beam. In a third embodiment of the invention the four bursts, which constitutes the TA-messages are distributed over the adaptive antenna beams. In a fourth embodiment of the invention the timing advance update information for all mobile stations that are located in the same beam is contained within the same TA-message. This is done by considering the beam affiliation of the mobile station in the initial set-up process. In a fifth embodiment of the invention the TA-messages for the mobile stations, which are assigned several timeslots, are sent in different beams. The best received TA-message is then used for all timeslots that the mobile station is assigned.

In a sixth embodiment of the invention each TA-message is dedicated to just one mobile station and is sent in the beam where the mobile station is located. it is also possible to combine the six versions of the invention.

SHORT DESCRIPTION OF THE DRAWINGS

The invention, together with further objects and advantages thereof, may be best understood by making reference to the following description taken together with the accompanying drawings, in which.

DETAILED DESCRIPTION

Six different embodiments have been defined. In order to illustrate the ideas a four-beam antenna system is used for five of the embodiments. However, for all solutions the extension to antenna systems with more beams is also discussed.

Sector Antenna

In a first embodiment a separate sector antenna could be used to do the update of the timing advance (TA). For every TA-burst the transmission is switched to the sector antenna thereby avoiding the problem that mobile stations are located outside the coverage area of the narrow beams.

The advantage with this embodiment is that TA-update works the same way as in a sector antenna system, hence, in which of the narrow beams the mobile stations are located does not need to be considered.

Arbitrary Number of Beams

The number of antenna beams does not have to be considered in this solution, i.e. the solution described above works for any number of beams.

One Beam at a Time

Figure 1:
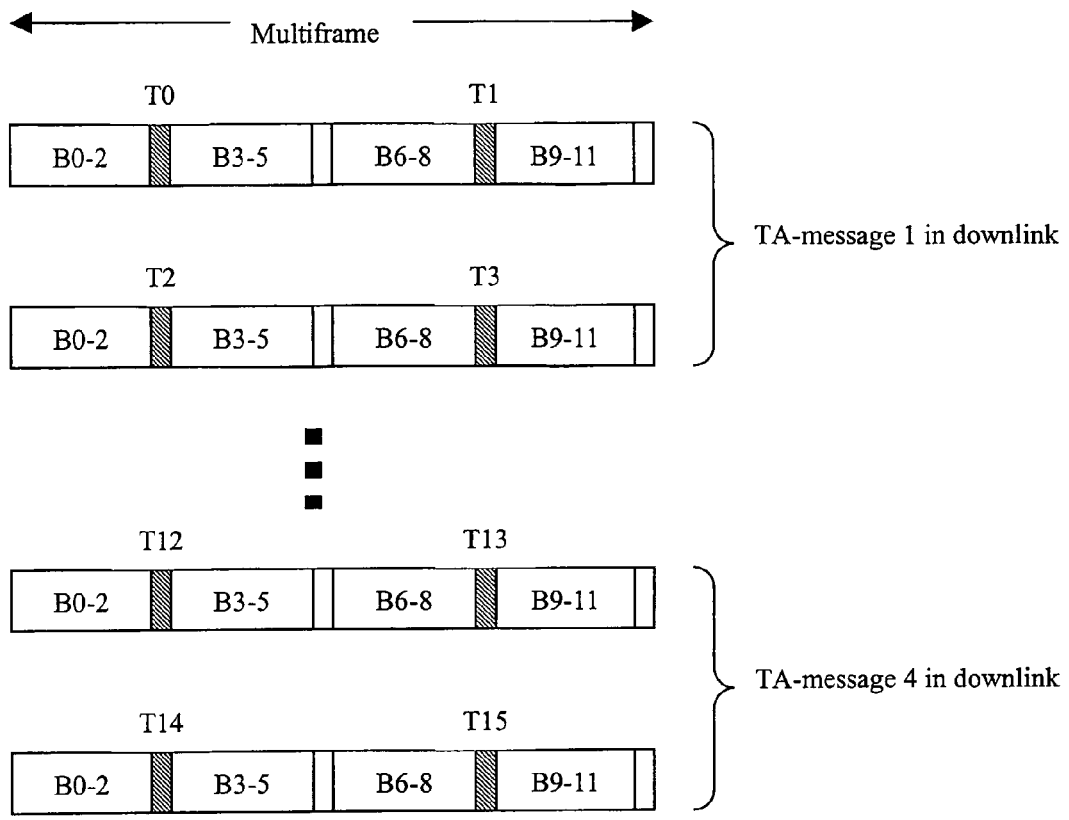
FIG. 1 illustrates the position of the timing advance messages in a GPRS or EGPRS multi-frame structure.
Figure 2:
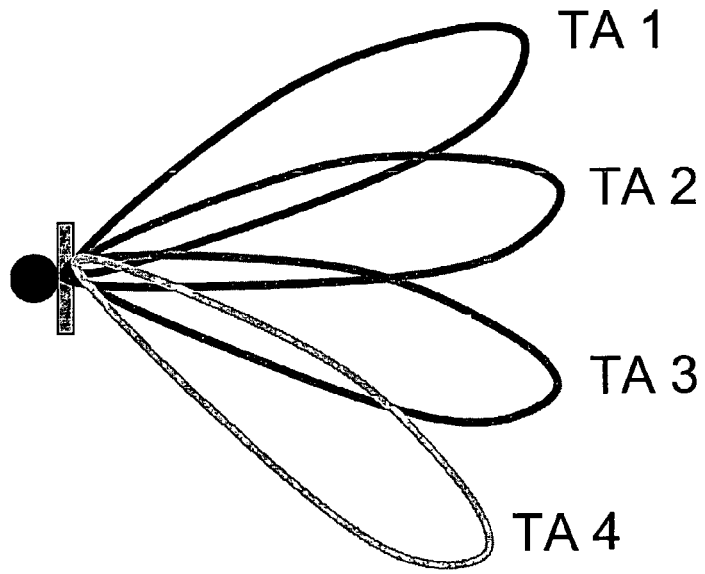
FIG. 2 illustrates updating of timing advance in one beam at a time.

In a second embodiment no regard is taken to the beam affiliation of the mobile stations when the Timing Advance Index (TAI) is assigned. The TA-messages are sent in one beam at a time, e.g. TA message 1 in beam 1, TA message 2 in beam 2, and so on (see FIG. 2).

The advantage of this embodiment is that it is simple to implement. The mobile stations will at least receive four good bursts.

Arbitrary Number of Beams

The second embodiment would work as intended for antenna systems with up to four beams. If there are more beams than TA messages (i.e. four) it will not be possible to send one TA message in each beam. It might hence happen that a mobile station has to wait for more than four TA messages before it receives an update in the beam where it is located.

TAI Assignment with Mobile Station Beam Consideration

In this embodiment the TA-message is sent in one beam at a time as in the previous embodiment. However, when the timing advance index, TAI, is assigned, the beam in which the mobile station is located is then considered.

Figure 3:
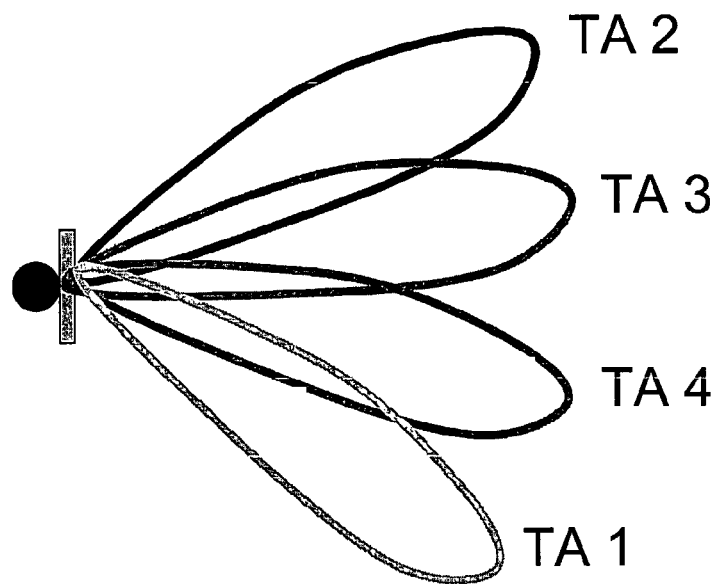
FIG. 3 illustrates a timing advance information assignment, where the beam location is taken into account.

E.g. all mobile stations located in beam 1 are assigned TAI between 0-3 i.e. they will be updated in TA message 2. Mobile stations located in beam 2 are assigned TAI between 4-7 and are updated in TA message 3 and so on (see FIG. 3).

Hence, TA message 2 is transmitted in beam 1 (where all the concerned mobiles are located), TA message 3 in beam 2 and so on.

The advantage of this embodiment is that the mobiles will receive four good bursts without delay Arbitrary Number of Beams Since there are four TA messages that can be assigned to different beams the solution would work for antenna systems with up to four beams.

Embodiment with Split Interleaving Bursts

Figure 4:
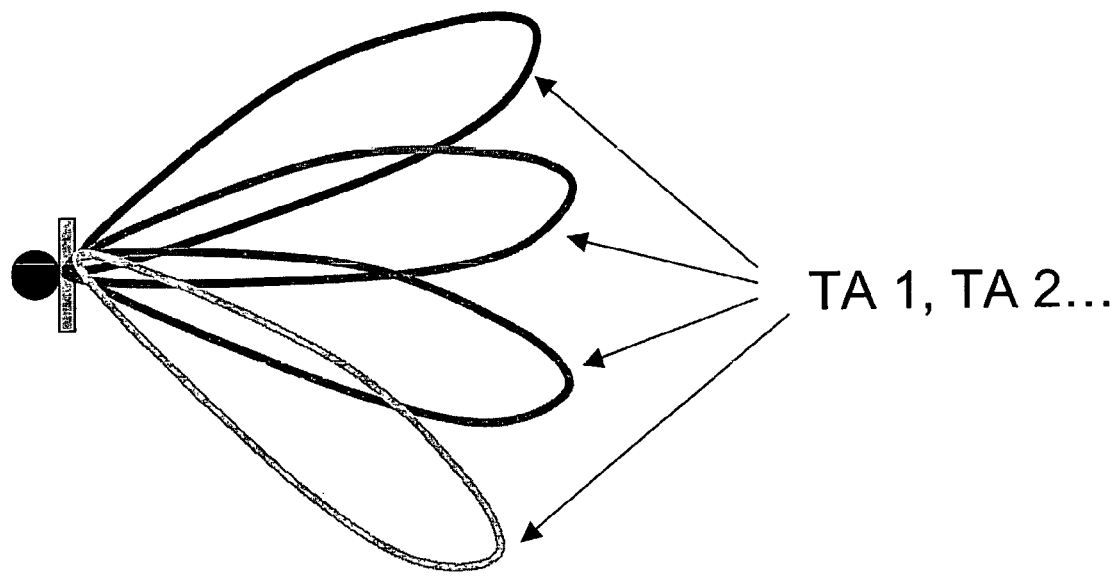
FIG. 4 illustrates a split interleaved timing advance message with sending one burst in each beam.

Version 1:

The TA-message is interleaved over four bursts (see FIG. 4). If one burst is transmitted in each beam the mobile stations will receive one good burst no matter in which beam there messages are situated. The other 3 bursts, which are transmitted in the "wrong" beam, might give enough extra information to decode the interleaved message.

The embodiment of version 1 has the advantage that the mobiles are guaranteed one good burst without delay.

Figure 5:
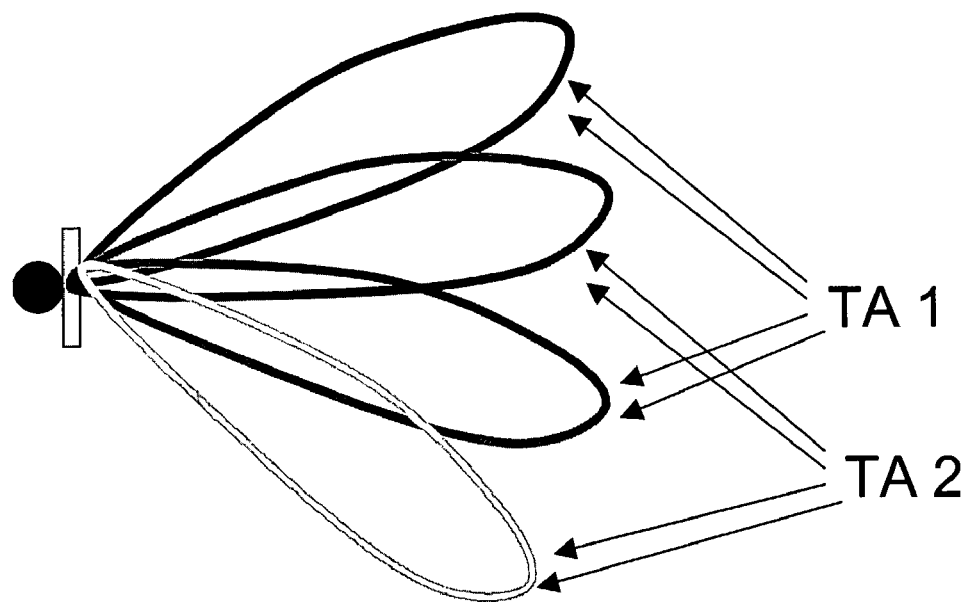
FIG. 5 illustrates a split interleaved timing advance message dividing the message and sending two bursts in one beam and two in another.

Version 2:

Send two bursts in each beam (see FIG. 5). Send the bursts for TA-message 1 in beams 1 and 3. For TA message 2, send the bursts in beams 2 and 4 and so on. The reason for sending in every second beam is that if the mobile station wanting to receive the message is not located in the right beam it will be located in a neighbouring beam which is the next best thing. One TA-message will be distributed over two beams. The mobile station will hence receive two good bursts and two bad bursts. Since the message is transmitted with a robust code (CS1) chances are that it can be decoded anyway.

This embodiment has the advantages that the mobile station receives two good bursts plus two bursts in a neighbouring beam.

Embodiment with Arbitrary Number of Beams

Version 1:

For up to 4 beam systems at least one burst per TA message is sent in the beam where the MS is located. For systems with more beams the bursts of more than one TA message would be needed to cover all beams. E.g. for an eight beam system the bursts of TA 1 could be sent in beams 1-4 and the bursts of TA 2 in beams 4-8. This of course implies an extra update delay.

Version 2:

As in version 1 but e.g. for an eight beam system all four TA messages would be needed to transmit 2 bursts in each beam.

Multi-Slot Synergy

Figure 6:
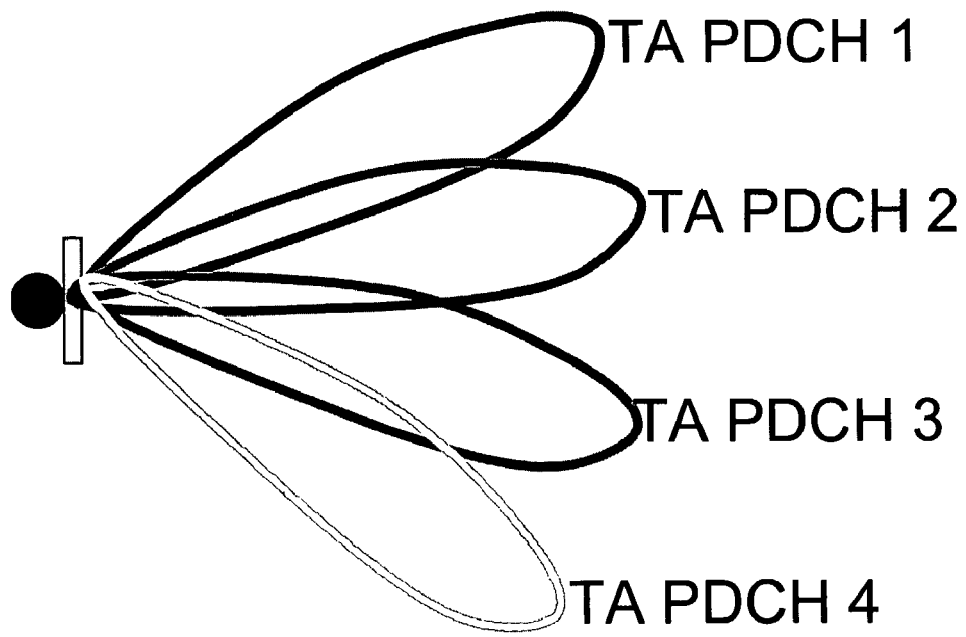
FIG. 6 illustrates timing advance for the different packet data channels being updated in different beams.

In (E)GPRS the mobile stations are in many cases assigned several timeslots. The timing advance value is however the same for all timeslots. If the timing advance is updated in different beams for different packet data channels, the mobile station could use the best received update value for all timeslots (see FIG. 6). The method works best if all mobile stations are assigned four packet data channels (PDCH). If less than four PDCH are assigned to a mobile station, the beam affiliation has to be considered when assigning the PDCH. Otherwise the TA update for the MS might be directed to a beam where the MS is not located.

Advantages: The mobile stations will receive four good bursts without delay.

Arbitrary Number of Beams

The solution works as long as the mobile station is assigned as many or more PDCH as there are antenna beams. The upper limit is eight beams since a mobile station can not be assigned more than 8 PDCH.

Embodiment with One MS Per TA Message

If only one mobile station needs to be updated for every TA message the beam pointing towards that mobile station can be used. This means that e.g. TAI=0, 4, 8 and 12 can be used for four mobile stations multiplexed on the same PDCH. If more than four MS are assigned to the same PDCH the first four should be assigned as described above. The fifth (and higher number MS) should if possible be updated in a TA message sent in the beam where they are located initially. If they should move out of that beam their TA update will be delayed.

Advantages of this embodiment having one MS per TA-message is that the TA message can always be sent to the MS in the right beam.

Arbitrary Number of Beams

For this solution there is no limitation to the number of antenna beams. Since each TA message is dedicated to one MS it can be sent in the beam where the MS is located.

ADVANTAGES OF THE INVENTION

The general advantage of all solutions is that continuous TA-update with minimum delay is made possible in adaptive antenna systems. By minimising the delay with which the TA-update message is received by the mobile station the issue of using old TA values, resulting in overlap of timeslots and bad quality, is mitigated.

REFERENCES

[1] 3GPP TS 43064.610 V6.1.0 (2003-09) Overall description of the GPRS radio interface.

The invention claimed is:

1. A method for adjusting transmission timings for mobile stations in a radio network using a standardised multi-frame structure in a (E)GPRS system, the method comprising:
using an adaptive antenna system having narrow beams, each individual beam covering a part of a network cell; and
updating the mobile stations by sending timing advance (TA) messages using the narrow beams of the adaptive antenna system, wherein
the mobile stations share a same packet data channel (PDCH),
the TA messages contain timing advance information for all mobile stations sharing the same PDCH, and
the TA messages are separate from RLC/MAC blocks.

2. The method according to claim 1, further comprising: updating mobile stations by sending a timing advance (TA) message in one beam at a time.

3. The method according to claim 1, further comprising: sending bursts of the TA message in each beam, thereby securing that the mobile stations as soon as possible obtain at least one good burst within minimum time period.

4. The method according to claim 1, further comprising: sending two bursts in each beam, thereby sending bursts for TA message 1 in beams 1 and 3 and TA message 2 in beams 2 and 4 and so on, whereby a mobile station will receive two good bursts out of a standard of four.

5. A method for adjusting transmission timings for mobile stations in a radio network using a standardized multi-frame structure in a (E)GPRS system, the method comprising:
using an adaptive antenna system having narrow beams, each individual beam covering a part of a network cell;
updating mobile stations by sending a timing advance (TA) message using the narrow beams of the adaptive antenna system; and
if a mobile station is assigned several timeslots, and these timeslots are to update its timing advance values in different beams, the mobile station uses the best received update value for all timeslots and shares an update message being sent in a correct beam between timeslots.

6. The method according to claim 1, further comprising: creating an assignment of mobile stations present such that all the mobile stations in one beam can be updated with a same TA message.

7. A method for adjusting transmission timings for mobile stations in a radio network using a standardised multi-frame structure in a (E)GPRS system, the method comprising:
using an adaptive antenna system having narrow beams, each individual beam covering a part of a network cell, said narrow beams being used for communicating with the mobile stations; and
using an additional antenna having a beam which covers an area of the network cell outside a coverage area of each individual narrow beam for transmitting TA messages to the individual mobile stations, wherein
the mobile stations share a same packet data channel (PDCH),
the TA messages contain timing advance information for all mobile stations sharing the same PDCH, and
the TA messages are separate from RLC/MAC blocks.

8. The method according to claim 7, wherein the beam of the additional antenna covers the whole network cell for transmitting the TA messages to the individual mobile stations.

9. A system for adjusting transmission timings for mobile stations in a radio network using a standardised multi-frame structure in a (E)GPRS system, said system comprising:
an adaptive antenna used for providing narrow beams, each individual beam covering a part of a network cell; and
means for sending timing advance (TA) messages by using the narrow beams of the adaptive antenna to individually update timing advances of the mobile stations, wherein
the mobile stations share a same packet data channel (PDCH),
the TA messages contain timing advance information for all mobile stations sharing the same PDCH, and
the TA messages are separate from RLC/MAC blocks.

10. The system according to claim 9, wherein said means for sending the TA messages sends the timing advance (TA) messages in one beam at a time.

11. The system according to claim 9, wherein said means for sending the TA messages interleaves the TA messages over their four bursts and sends one burst in each beam, thereby securing that the mobile stations as soon as possible obtain at least one good burst within a minimum time period.

12. The system according to claim 9, wherein said means for sending the TA messages transmits two bursts in each beam, thereby sending bursts for TA message 1 in beams 1 and 3 and TA message 2 in beams 2 and 4 and so on, whereby each mobile station will receive two good bursts out of a standard of four.

13. A system for adjusting transmission timings for mobile stations in a radio network using a standardized multi-frame structure in a (E)GPRS system, said system comprising:
an adaptive antenna used for providing narrow beams, each individual beam covering a part of a network cell; and
means for sending timing advance (TA) messages by using the narrow beams of the adaptive antenna to individually update the mobile stations,
wherein if a mobile station is assigned several timeslots, it is made sure that these timeslots should update its timing advance values in different beams, whereby the mobile stations then use the best received update value for all timeslots and share an update message being sent in a correct beam between timeslots.

14. The system according to claim 9, wherein an assignment of mobile stations present is created such that all the mobile stations in one beam can be updated at a same time.

15. A system for adjusting transmission timings for mobile stations in a radio network using a standardised multi-frame structure in a (E)GPRS system, said system comprising:
    an adaptive antenna used for providing narrow beams, each individual beam covering a part of a network cell, said narrow beams being used for communicating with the mobile stations; and
    an additional antenna having a beam which covers an area of the network cell outside a coverage area of each individual narrow beam for transmitting TA messages to the individual mobile stations, wherein
    the mobile stations share a same packet data channel (PDCH),
    the TA messages contain timing advance information for all mobile stations sharing the same PDCH, and
    the TA messages are separate from RLC/MAC blocks.

16. The system according to claim 15, wherein the beam of the additional antenna covers the whole network cell for transmitting the TA messages to the individual mobile stations.

17. A method performed under a control of a base transceiver station (BTS) for adjusting transmission timings in a radio network, the method comprising:
    sending a plurality of timing advance (TA) messages to a plurality of mobile stations over a plurality of narrow beams of an adaptive antenna system associated with the BTS, wherein
    each narrow beam covers a part of a coverage area of the BTS in which only one narrow beam is activated at a time within the coverage area,
    the mobile stations all share a same packet data channel (PDCH),
    each TA message includes timing advance information for all mobile stations sharing the same PDCH,
    within each TA message, the timing advance information for one or more of the mobile stations sharing the same PDCH are updatable relative to a previous TA message,
    the timing advance information for all mobile stations sharing the same PDCH are updatable within a predetermined number of the TA messages,
    each TA message is interleaved and divided into a plurality of bursts, and
    the TA messages are separate from RLC/MAC blocks.

18. The method according to claim 17, wherein the step of sending the plurality of the TA messages comprises:
    sending all bursts of a first TA message over a first narrow beam; and
    sending all bursts of a second TA message over a second narrow beam.

19. The method according to claim 18, wherein
    the first and second TA messages are sent in sequence,
    timing advance information for one or more mobile stations are updated in the second TA message relative to the first TA message, and
    at least one mobile station whose timing advance information has been updated in the second TA message is located in the coverage area of the second narrow beam.

20. The method according to claim 17, wherein the step of sending the plurality of the TA messages comprises:
    distributing the bursts of the TA messages over the narrow beams such that for each TA message, a first burst is sent over a first narrow beam and a second burst is sent over a second narrow beam,
    wherein the first and/or the second narrow beam corresponding to one TA message is same or different from the first and/or the second narrow beam corresponding to another TA message.

21. The method according to claim 20, wherein
    in the step of distributing the bursts of the TA bursts, the distribution is such that for each TA message, a third burst is sent over a third narrow beam and a fourth burst is sent over a fourth narrow beam, and
    the third and/or the fourth narrow beam corresponding to one TA message is same or different from the third and/or the fourth narrow beam corresponding to another TA message.

22. The method according to claim 20, wherein
    the first and second beams are spatially adjacent to each other, and
    in the step of distributing the bursts of the TA bursts, the distribution is such that for each TA message, a third burst is sent over the first narrow beam and a fourth burst is sent over the second narrow beam.

23. The method according to claim 22, wherein
    in the step of distributing the bursts of the TA bursts, the distribution is such that for each TA message, the first and third bursts are also sent over a third narrow beam and the second and fourth bursts are also sent over a fourth narrow beam, and
    the third narrow beam is spatially adjacent to the second narrow beam, and the fourth narrow beam is spatially adjacent to the third narrow beam, and
    the third and/or the fourth narrow beam corresponding to one TA message is same or different from the third and/or the fourth narrow beam corresponding to another TA message.

24. The method of claim 17, wherein the method is performed without involvement from a packet control unit (PCU).

* * * * *

UNITED STATES PATENT AND TRADEMARK OFFICE
CERTIFICATE OF CORRECTION

| | |
|---|---|
| PATENT NO. | : 7,979,090 B2 |
| APPLICATION NO. | : 11/597835 |
| DATED | : July 12, 2011 |
| INVENTOR(S) | : Alm et al. |

It is certified that error appears in the above-identified patent and that said Letters Patent is hereby corrected as shown below:

In Column 1, Line 44, delete "GRPS" and insert -- GPRS --, therefor.

In Column 2, Line 59, delete "it" and insert -- It --, therefor.

NOTE: In the Issued Patent, on the Face Page, "(58) Field of Classification Search" is missing.

Signed and Sealed this
Tenth Day of January, 2012

David J. Kappos
*Director of the United States Patent and Trademark Office*